United States Patent [19]

Runggaldier et al.

[11] Patent Number: 5,410,240
[45] Date of Patent: Apr. 25, 1995

[54] METHOD AND DEVICE FOR OPEN-LOOP CONTROL OF SINGLE-PHASE OR MULTIPHASE A.C. POWER CONTROLLERS

[75] Inventors: Diethard Runggaldier, Stegaurach, Germany; Bruno C. Doerwald, Duluth, Ga.

[73] Assignee: Firma Carl Freudenberg, Weinheim, Germany

[21] Appl. No.: 761,777

[22] PCT Filed: Jan. 19, 1990

[86] PCT No.: PCT/DE90/00030
§ 371 Date: Oct. 7, 1991
§ 102(e) Date: Oct. 7, 1991

[87] PCT Pub. No.: WO90/09701
PCT Pub. Date: Aug. 23, 1990

[30] Foreign Application Priority Data
Feb. 7, 1989 [EP] European Pat. Off. ........ 89102065.3

[51] Int. Cl.⁶ .................. G05F 1/455; H02P 7/622
[52] U.S. Cl. .................. 323/237; 323/241; 318/729
[58] Field of Search .......... 323/237, 241, 300, 320, 323/325; 363/89; 318/729, 812

[56] References Cited

U.S. PATENT DOCUMENTS

| 4,388,578 | 6/1983 | Green et al. | 318/729 |
| 4,412,167 | 10/1983 | Green et al. | 318/729 |
| 4,413,217 | 11/1983 | Green et al. | 318/729 |
| 4,800,326 | 1/1989 | Unsworth | 318/729 |

FOREIGN PATENT DOCUMENTS 2084359 4/1982 United Kingdom .

OTHER PUBLICATIONS

Electronic Components and Applications, vol. 4, No. 4, Aug. 1982, Eindhoven, NL, pp. 207-214; J. E. Gilliam: "Microprocessor-Based Phase Controller—The 'Look-Back' System".

Primary Examiner—Steven L. Stephan
Assistant Examiner—Adolf Berhane
Attorney, Agent, or Firm—Kenyon & Kenyon

[57] ABSTRACT

In the open-loop control of A.C. power controllers through the phase-angle control of semiconductor valves (4), the chronological sequence of the firing signals (Z) for the semiconductor valves (4) is determined by reference signals (X). When the reference signals (X) fail for one or more periods, this chronological sequence is disturbed and damage to the load (2) to be controlled can result. Therefore, according to the invention, a method is provided whereby a safety firing signal (ZS) is always derived from the preceding firing signals (Z) when the expected reference signal (X) fails. In addition, a device for implementing the method is specified.

23 Claims, 2 Drawing Sheets

METHOD AND DEVICE FOR OPEN-LOOP CONTROL OF SINGLE-PHASE OR MULTIPHASE A.C. POWER CONTROLLERS

BACKGROUND OF THE INVENTION

The present invention relates to a method and a device for open-loop control of single-phase or multiphase A.C. power controllers through phase-angle control of semiconductor valves.

Alternating current (A.C.) power controllers are used to provide for closed-loop control of the power supplied to an electrical load in an A.C. system. These power controllers are triggered through the phase-angle control of semiconductor valves. Particularly during the operation of an A.C. motor, changing operational conditions, such as different loading of the motor during start-up or lag phases when it is turned ON and OFF, require a closed-loop control of the power supplied to the motor to protect the power system, the motor and the driving gear from unnecessary loads.

British Patent 2 084 359 discloses a device for open-loop control of an A.C. power controller for an A.C. motor. This device is supposed to improve an unfavorable power factor caused, for example, by underloading of the motor. For this purpose, controllable semiconductor valves, in particular a triac, a bidirectional triode thyristor, or an antiparallel thyristor circuit, are assigned to the motor for each lag phase. These semiconductor valves enable power to be supplied in dependence upon the prevailing operating conditions of the motor by means of phase-angle control. The power factor is improved with this known device because the phase difference between the current and voltage is detected for each phase in a forward controlling element and reduced by properly increasing the ignition angle, i.e., the period of time that elapses between the current zero crossing and the point of ignition.

In the case of the known device, the instant of time of current zero crossing, which is determined by measuring the voltage applied across the triac, is used as the time reference for determining the point of ignition. This voltage is fed to a comparator, whose output states correspond to the circuit states of this triac. The current zero crossing corresponds then to an edge of the output signal from the comparator. From this edge and with the help of a monoflop, a strobe pulse is generated for a ramp voltage that is synchronized with the zero crossing of the supply voltage. The sampled value of the ramp voltage is subtracted from a reference voltage that is input externally by way of a potentiometer and transmitted to the inverting input of a differential amplifier, whose output voltage is fed, together with the ramp voltage to a further comparator. That second generator generates a primary firing signal via a downstream trigger pulse generator, when the ramp voltage exceeds the output voltage of the differential amplifier. Therefore, with this circuit arrangement, the phase shift between the motor current and the motor voltage, and thus the power factor, is stabilized at a value which is specified by the reference voltage set on the potentiometer.

Practice has shown, however, that there are problems when the instants of current zero crossings are determined by measuring the voltage drop across the semiconductor valve, reactions can occur as the result of induced voltages, particularly when there are inductive loads. These reactions make it more difficult to reliably determine the instants when the current goes to zero. Then, as a result of inductive reactions emanating from a continuously turning rotor, for example, it can happen that the voltage measured across the semiconductor valve does not reach the threshold value required to switch over the comparator, so that disturbances occur in the course of the firing sequence. In multiphase A.C. motors, direct-current components can then build up and result in the motor being subjected to shock or sudden impact loads.

To substantially eliminate these types of disturbances, one must select the lowest possible threshold value for the comparator. However, this type of solution entails increasing sensitivity and in turn susceptibility to faults caused by system disturbances and inductive voltage surges in the control of inductive loads.

Therefore, in view of the sensitivity of the measuring device, a compromise must always be made when determining a reference instant for the time control of the phase angles.

SUMMARY OF THE INVENTION

The present invention addresses the problems giving rise to this compromise and specifies a method for open-loop control of single-phase or multiphase A.C. power controllers, which is substantially insensitive to external disturbances, while providing a high performance reliability. The present invention also provides a device for implementing the method.

In a method according to the present invention there is open loop control of single phase or multiphase A.C. power controller through phase angle control of semiconductor valves. Reference signals are detected from the current flowing in at least one phase to derive time-delayed firing signals. A safety firing signal always follows a specified time interval, that is derived from the time-delayed firing signals, when no reference signal is detected in the specified time interval.

Since the semiconductor valves are even fired when the reference signal that controls the chronological sequence of the firing signals fails for one or more periods, the thresholds required for generating a reference signal can be increased. Therefore, it is less likely for the chronological sequence of the firing to be disturbed by unintentional firings, and one does not have to put up with the firing being interrupted for one or more phases. This is particularly advantageous for open-loop control of motors, since these measures permit an operation that is less susceptible to faults.

The time interval between the firing signal and the subsequent safety firing signal can thereby be constant and preferably corresponds to an angular distance of about 180°.

A preferred embodiment of the method according to the present invention provides for a variable time interval which is dependent on the number of reference signals that are missing in succession or that come too late. From one period to another namely, fluctuations in the phase relation between current and voltage can occur and can cause the subsequent reference signal to be shifted by more than 180°. This can lead to a continuous firing in the case of firing angles which lie within the range of these fluctuations, which is not desirable. To avoid this, a time interval that corresponds to an angle greater than 180°, preferably about 185° is provided for the first safety firing signal. According to a particularly preferred embodiment of the method, to prevent the accepted phase shift from adding up when the reference signal fails repeatedly during subsequent periods, the time interval to a second safety firing signal is selected to be less than 180°, for example 175°. With N successive safety firing signals, one must ensure then that their respective time intervals $P_1, P_2, P_n, \ldots P_{n-1}, P_n, P_N$ satisfy the condition $$\left| \sum_{n=1}^{N} (P_n f \cdot 360°) - N \cdot 180° \right| < F$$

whereby f represents the system frequency and F the permitted phase error, which should always be less than 15°, preferably less than 10°.

The reference signal is essentially used thereby to obtain a time reference for the open-loop control. It can be derived from characteristic instants in the temporal current path or voltage waveshape. To determine a reference signal, it is advantageous to use the current zero crossings as characteristic instants; they are preferably derived then from the voltage drop across the semiconductor valve. In a preferred embodiment of the present invention, this reference signal is available in the form of a binary signal with two levels, whose edges are particularly well suited for timing control.

BRIEF DESCRIPTION OF THE DRAWINGS

To further clarify the invention, reference is made to the drawings, in which.

DETAILED DESCRIPTION

Figure 1:
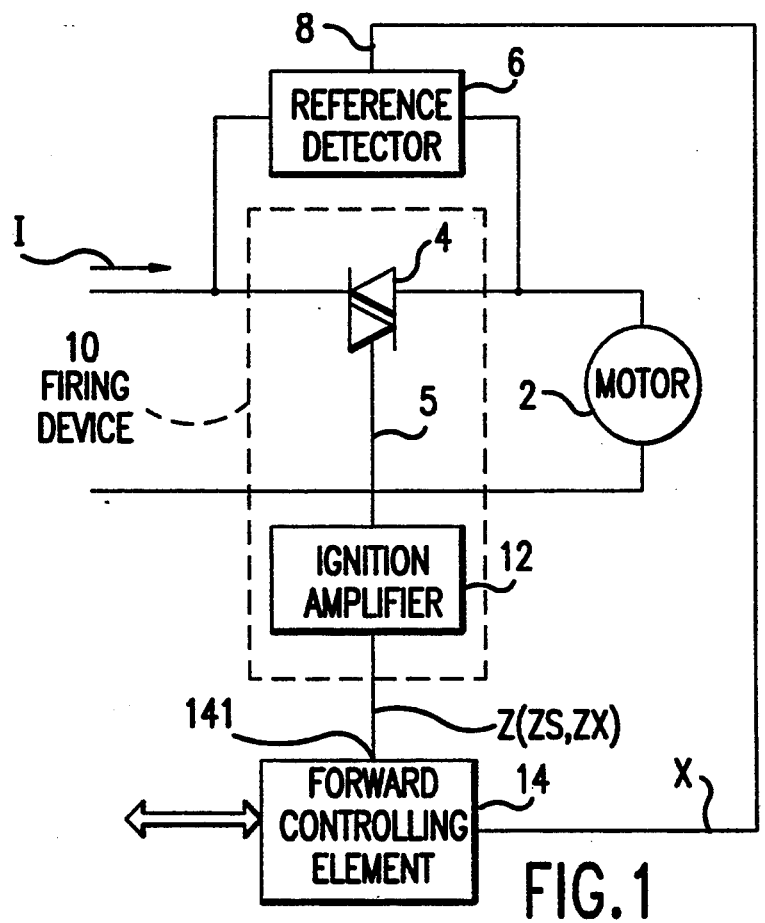
FIG. 1 illustrates a block diagram of an embodiment of a device for implementing the method according to the present invention.

According to FIG. 1, a load, for example a motor 2, is connected via a semiconductor valve 4, for example a triac or a circuit consisting of several semiconductor valves, such as a thyristor circuit arrangement, to the phase of a single-phase alternating system. The semiconductor valve 4 is provided with a control electrode 5 and is part of a firing device 10, which contains an ignition amplifier 12, for example an opto-triac or an ignition transformer, that is required for operating the semiconductor valve 4. An optically fired semiconductor valve can also be provided in place of an electrically fired semiconductor valve.

The open-loop control of the semiconductor valve 4 takes place through phase-angle or ignition-phase control. To this end, in dependence upon the phase relation, a firing signal that causes the semiconductor valve 4 to be fired, is applied to the control electrode 5.

In the preferred specific embodiment according to the FIG. 1, a reference detector 6 is assigned to the semiconductor valve 4. This reference detector 6 determines, for example, the current zero crossing of the current I flowing in the electric circuit as a function of the voltage drop across the semiconductor valve 4. The current zero crossing is used to establish a time reference for the phase-angle control. A corresponding reference signal X is made available at the output 8 of the reference detector 6. For this purpose, the reference detector 6 contains, for example, a comparator, which compares the absolute value of the voltage drop across the semiconductor valve 4 to a defined threshold value.

Thus, a reference signal X with two levels is applied to the output 8. One level is a state that indicates that a current is flowing in the phase. If this current is smaller than a limiting current value that corresponds to the threshold voltage value the second state for the reference signal is provided. By properly selecting a low value for this threshold, for example about 10 V, this level essentially corresponds then to zero current and the reference signal X essentially reproduces the circuit states of the semiconductor valve 4. The edges between these two circuit states then coincide in time at least roughly with the current zero crossing of the current I flowing through the semiconductor valve 4.

To establish a time reference for the phase-angle control, one can also draw upon another characteristic parameter in the current's time slope, for example the maximum or minimum, or upon a characteristic parameter in the time slope of the voltage.

The output 8 of the reference detector 6 is connected to a forward controlling element 14, which shunts off a time-delayed firing signal Z and holds it ready at a control output 141. This firing signal Z is either a safety firing signal ZS derived from the preceding firing signal Z or a firing signal ZX derived from the reference signal X and time-delayed in accordance with a specified firing angle.

The firing angle is defined by the forward controlling element 14, for example within the scope of a control program that can be selected externally, as well as within the scope of motor parameters that can be input externally. It is also possible for the firing angle to be time-dependent through a program that runs internally in the forward controlling element 14. Thus, for example, the motor 2 is able to start smoothly as the result of a time-dependent firing angle, which starting from a specified starting value is reduced to a minimal value.

Figure 2:
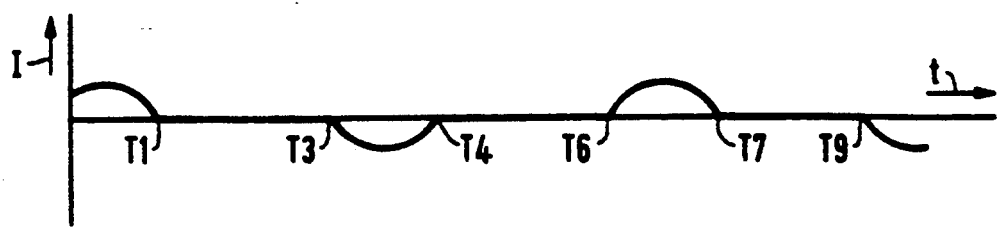
FIGS. 2 through 5 show electric signals used to control the firing operation that are plotted in a diagram over time to clarify the method according to the present invention.
Figure 3:
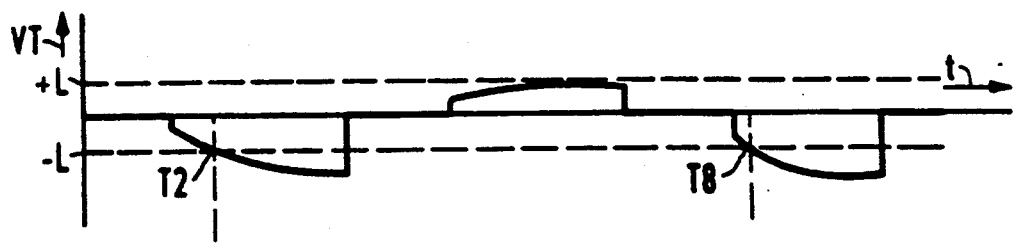
Figure 4:
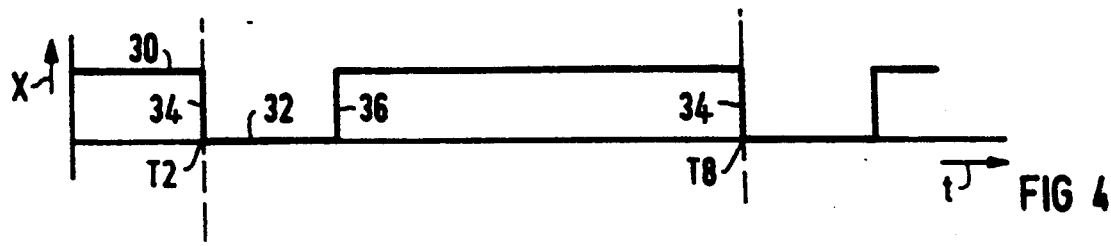

In FIG. 2, the current I flowing through the semiconductor valve and, in FIG. 3, the voltage drop VT existing across the semiconductor valve, are plotted over time. When the current is extinguished at the instant T1, the voltage drop increases and, due to the inductive reaction of the rotating motor, at a later instant, T2, attains the threshold value −L required to switch the comparator that follows. The comparator configured in the reference detector 6 then switches, in accordance with FIG. 4, from a signal level 30 to a signal level 32. These two signal levels 30 and 32 correspond to two logic states, which indicate whether the voltage drop across the semiconductor valve is smaller or greater in value than the threshold value L. The signal levels 30 and 32 are separated from each other by a first, in the example of the figure, falling edge 34 and a second, in the example of the figure, rising edge 36. In the ideal case, these edges correspond to the instant the current zero point is reached and the firing instant respectively.

Starting from the edge 34, the forward controlling element 14 generates a firing signal Z at the instant T2+DT. This firing signal Z is delayed by the delay time DT and results in the current being re-ignited at the instant T3. The firing signal Z is generated by the reference signal X and therefore, in addition, designated as ZX in FIG. 5.

At the instant T4, the current is once more extinguished and the voltage drop VT across the semiconductor valve rises. However, in the example of FIG. 3, it does not attain the threshold value +L, which is required to generate an edge 34 for the reference signal X. This can be the case, for example, when the motor is underloaded for the short term and the voltages induced in the motor windings when the motor continues to run prevent the voltage drop VT across the semiconductor valve from being large enough to attain the threshold value +L required for switching. In this case, at the instant T5, the forward controlling element makes available a safety firing signal ZS, which is delayed with respect to the preceding firing signal Z by an absolute or preset time interval P and causes the current to be fired at the instant T6. This time interval P corresponds to an angular distance, which is preferably greater than 175° and smaller than 185°, in particular about 180°.

At the instant T7, the current is once again extinguished and, in the example of FIG. 3, a voltage drop is generated across the semiconductor valve and, at the instant TS, reaches the threshold value −L required to switch the comparator. After a time delay DT, a firing signal Z is generated, which causes the current to be re-ignited at the instant T9. This firing signal, in turn, is generated by the reference signal X and is therefore likewise designated as ZX in FIG. 5.

Figure 5:
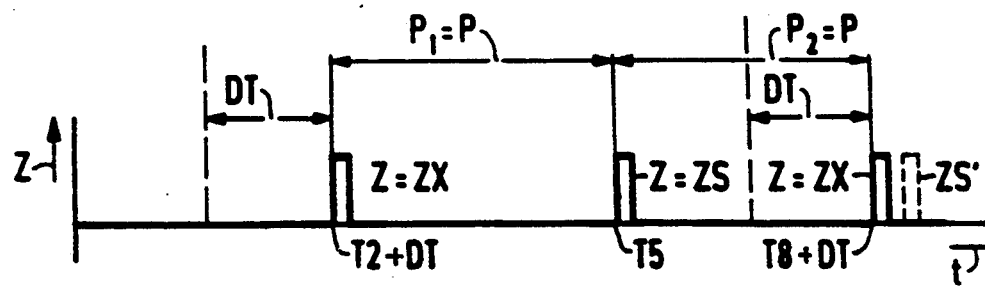

A safety firing signal ZS' is likewise drawn with a dotted line in FIG. 5. This safety firing signal ZS' would then be applied when no reference signal X is transmitted within the time interval T5+P by the reference detector to the forward controlling element.

In the example of FIG. 5, a time interval $P_2$ for the safety firing signal ZS' is also drawn in. It corresponds to the time interval $P_1$ between the firing signal ZX and the safety firing signal ZS. According to an advantageous modification, for example, the danger of continuously firing with the same small firing angle differential can be avoided by having variable time intervals $P_1$ and $P_2$. In this case, it is particularly advantageous for $P_1$ to correspond to an angular distance of 180°+D and $P_2$ to an angular distance of 180°−D. Here, D preferably amounts to about 5°, so that generally the relationship $$P_{2n+1} \cdot f \cdot 360° 180° + D \text{ and } P_{2n} \cdot f \cdot 360° = 180° - D$$

is satisfied, whereby the running index represents the number of safety firing signals in series that are not triggered by a reference signal. This guarantees that the phase error is still limited even when safety firing signals occur repeatedly in series.

Figure 6:
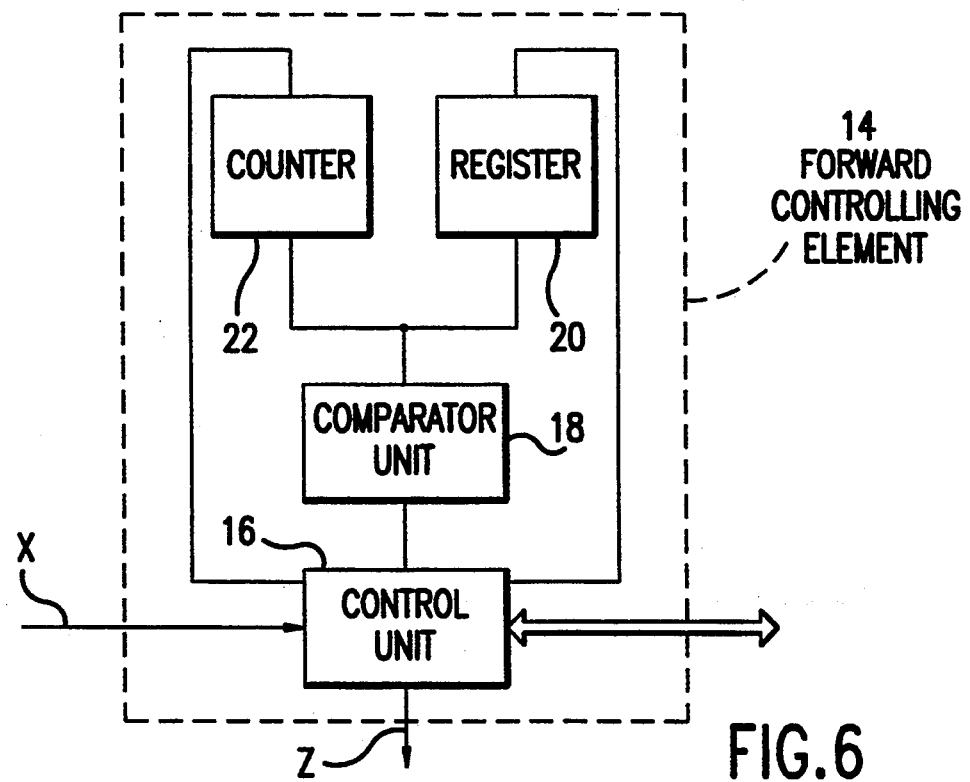
FIG. 6 shows a block diagram of another embodiment of a device for implementing the method according to the invention.

In an advantageous specific embodiment according to FIG. 6, the forward controlling element comprises a control unit 16, which is connected to the reference detector. The control unit 16 is connected to a free-running counter 22 and reads the counter reading at an instant that is specified by the reference signal X, for example, by means of its falling edge. This value is stored in a register 20 that is connected to the control unit 16. The counter 22 and the register 20 are connected to a comparator unit 18, which continually compares the reading of counter 22 to the reading of register 20 and, when there is conformity, causes the control unit 16 to apply a firing signal.

Figure 7A:
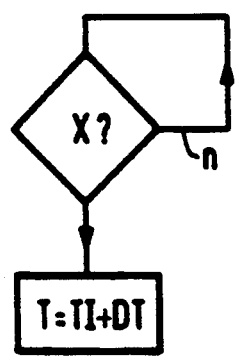
FIG. 7 is a flow chart illustrating the operation of the embodiment of FIG. 6.
Figure 7B:
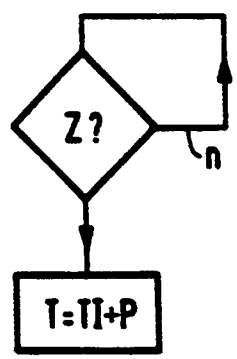
Figure 7C:
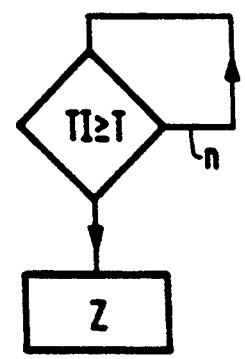

In a preferred specific embodiment, the forward controlling element 14 comprises a microprocessor, in which three asynchronous processes are provided. They are illustrated on the basis of the flow charts of FIG. 7. In a first process, the system waits for a reference signal X to appear and then, for example, when a falling edge 34 appears, a preset delay time DT is added to the current reading TI of the free-running counter 22 and recorded in the register 20. Moreover, a further process is provided, which reads out the current reading TI of the free-running counter 22 when a firing signal Z appears, for example at the rising edge of the firing signal Z, adds a specified value P to it, and likewise stores the sum in register 20. A further process tests, if the reading TI of the free-running counter 22 is greater or equal to the reading T of register 20. If this is the case, then a firing signal Z is applied.

The present invention is clarified for single-phase A.C. power controllers on the basis of FIGS. 1 through 7. The same considerations also apply, however, for each phase of a multiphase A.C. power controller.

What is claimed is:

1. A method for open-loop control of single-phase or multiphase A.C. power controllers through phase-angle control of semiconductor valves comprising the steps of:
    a) detecting reference signals from a current flowing in at least one phase;
    b) deriving time-delayed firing signals from the detected reference signals; and
    c) producing a safety firing signal that follows in a specified time interval after a preceding time-delayed firing signal when no reference signal is detected within said specified time interval, wherein said safety firing signal is derived from a preceding time-delayed firing signal.

2. The method according to claim 1, wherein said step of producing further comprises delaying subsequent safety firing signals by a constant time interval, which corresponds to an angular distance of about 180°.

3. The method according to claim 1, wherein the specified time interval is variable and is dependent on the number of reference signals X that are missing in succession or that are produced outside of an expected time period.

4. The method according to claim 3, wherein a time interval for a first safety firing signal corresponds to an angular distance greater than 180° and less than 190°.

5. The method according to claim 4, wherein with N successive safety firing signals, the condition $$\left| \sum_{n=1}^{N} (P_n f \cdot 360°) - N \cdot 180° \right| < 10°$$

is satisfied, whereby $P_1, P_2, \ldots P_n, P_N$ are respective time intervals, N is an integer greater than or equal to 1 and f is a system frequency.

6. The method according to claim 1 further comprising the steps of:
    d) providing as a reference signal a signal with two logic states whose first state corresponds to a voltage drop across the semiconductor valve which is greater in value than a specified threshold value, and whose second state corresponds to a voltage drop that is less in value than said specified threshold value;
    e) deriving a second instant of time from an edge between these two logic states, which corresponds to an attainment of the current zero point, and then storing said second instant of time for use in providing a time-delayed firing signal;

f) deriving a first instant of time from an edge of the firing signal and then storing the first instant for use in providing a subsequent, timedelayed safety signal; and g) applying a firing signal determined by the instant of time last stored.

7. A method for the open-loop control of single-phase or multiphase A.C. power controllers through the phase-angle Control of semiconductor valves comprising the steps of:

a) detecting a reference signal from a current flowing in at least one phase;

b) deriving time-delayed firing signals from the detected reference signal:

c) producing a safety firing signal that follows in a specified time interval after a preceding time-delayed firing signal when no reference signal is detected within said time interval, said safety firing signal being derived from a preceding time-delayed firing signal, wherein subsequent safety firing signals are delayed by a constant time interval, which corresponds to an angular distance of about 180°;

d) providing as the reference signal a signal with two logic states whose first state corresponds to a voltage drop across the semiconductor valve which is greater in value than a specified threshold value, and whose second state corresponds to a voltage drop that is less in value than said specified threshold value;

e) deriving a second instant of time from an edge between these two logic states, which corresponds to an attainment of the current zero point, and then storing said second instant of time for use in providing a time-delayed firing signal;

f) deriving a first instant of time from an edge of the firing signal and then storing the first instant for use in providing a subsequent, time-delayed safety signal; and g) applying a firing signal determined by the instant of time last stored.

8. A method for the open-loop control of single-phase or multiphase A.C. power controllers through the phase-angle control of semiconductor valves comprising the steps of:

a) detecting reference signals from a current flowing in at least one phase;

b) deriving time,delayed firing signals from the detected reference signals:

c) producing a safety firing signal that follows in a specified time interval after a preceding time-delayed firing signal when no reference signal is detected within said time interval, said safety firing signal being derived from a preceding time-delayed firing signal, wherein the time interval is variable and is dependent on the number of reference signals X that are missing in succession or that are produced outside of an expected time period;

d) providing as the reference signal a signal with two logic states whose first state corresponds to a voltage drop across the semiconductor valve which is greater in value than a specified threshold value, and whose second state corresponds to a voltage drop that is less in value than said specified threshold value;

e) deriving a second instant of time from an edge between these two logic states, which corresponds to an attainment of the current zero point, and then storing said second instant of time for use in providing a time-delayed firing signal;

f) deriving a first instant of time from an edge of the firing signal and then storing the first instant for use in providing a subsequent, timedelayed safety signal; and g) applying a firing signal determined by the instant of time last stored.

9. The method according to claim 8, wherein a time interval for a first safety firing signal corresponds to an angular distance greater than 180° and less than 190°.

10. The method according to claim 9, wherein with N successive Safety firing signals, the condition $$\left| \sum_{n=1}^{N} (P_n f \cdot 360°) - N \cdot 180° \right| < 10°$$

is satisfied, whereby $P_1, P_2, \ldots P_n, \ldots P_N$ are the respective time intervals, N is an integer greater than or equal to 1 and f is the system frequency.

11. A device for open-loop control of single phase or multiphase A.C. power controllers comprising:

a) a semiconductor valve in series connection between a load and a phase of the A.C. system, the semiconductor valve having a control electrode;

b) a reference detector shunting off reference signals from the semiconductor valve; and c) a forward controlling element connected to said reference detector for supplying time-delayed firing signals, wherein the forward controlling element comprises means for deriving a safety firing signal that follows within a preset time interval, that is always derived in each case from the time delayed firing signals, when no reference signal is detected within this preset time interval.

12. The device according to claim 11, wherein subsequent safety firing signals derived from the sequence of firing signals are delayed by a constant time interval, which corresponds to an angular distance of about 180°.

13. The device according to claim 11, wherein the time interval is variable and is dependent on the number of reference signals X that are missing in succession or that are produced outside of expected time period.

14. The device according to claim 11, wherein a time interval for a first safety firing signal corresponds to an angular distance greater than 180° and less than 190°.

15. The device according to claim 11, wherein with N successive safety firing signals, the condition $$\left| \sum_{n=1}^{N} (P_n f \cdot 360°) - N \cdot 180° \right| < 10°$$

is satisfied, whereby $P_1, P_2, \ldots P_n, \ldots, P_N$ are the respective time intervals, N is an integer greater than or equal to 1 and f is the system frequency.

16. A device for open-loop control of single phase or multiphase A.C. power controllers comprising:

a) a semiconductor valve in series connection between a load and a phase of the A.C. system, the semiconductor valve having a control electrode;

b) a reference detector shunting off reference signals from the semiconductor valve;

c) a forward controlling element connected to said reference detector for supplying time-delayed firing signals, wherein the forward controlling element comprises means for deriving a safety firing signal that follows within a preset time interval, that is always derived in each case from the time delayed firing signals, when no reference signal is detected within this preset time interval wherein said forward controlling element comprises:
 d) a flee-running counter;
 e) a control unit, which reads out the reading of free-running counter at an instant determined by the reference signal;
 f) a register, which is loaded by said control unit with a value that results from a sum of the counter reading that is read out and a preset delay time; and
 g) a comparator unit, which compares the reading of the counter to the reading of the register and, in dependence upon the result of the comparison, causes a firing signal to be applied.

17. A method for open-loop control of single-phase or multiphase A.C. power controllers through phase-angle control of semiconductor valves comprising the steps of:
 a) producing firing signals being used for firing the semiconductor valves;
 b) producing reference signals when the current flowing in at least one phase reaches a predetermined characteristic value, each of said reference signals defining a time instant at which the current reaches its characteristic value;
 c) testing whether a reference signal has been produced within a specified time interval following a preceding firing signal; and
 d) deriving as a firing signal a time-delayed firing signal from the reference signal if a reference signal has been produced within said specified time interval or a safety firing signal from a preceding time-delayed firing signal, if a reference signal has not been produced within said specified time interval, said safety firing signal following in said specified time interval after said preceding time-delayed firing signal.

18. The method according to claim 17, wherein said step of deriving further comprises delaying subsequent safety firing signals by a constant time interval, which corresponds to an angular distance of about 180°.

19. The method according to claim 17, wherein the specified time interval is variable and is dependent on the number of reference signals X that are missing in succession or that are produced outside of an expected time period.

20. The method according to claim 19, wherein a time interval for a first safety firing signal corresponds to an angular distance greater than 180° and less than 190°.

21. The method according to claim 20, wherein with N successive safety firing signals, the condition $$\left| \sum_{n=1}^{N} (P_n f \cdot 360°) - N \cdot 180° \right| < 10°$$

is satisfied, whereby $P_1, P_2, \ldots P_n, \ldots, P_N$ are respective time intervals, N is an integer greater than or equal to 1 and f is a system frequency.

22. The method according to claim 17, further comprising the steps of:
 e) providing as a reference signal a signal with two logic states whose first state corresponds to a voltage drop across the semiconductor valve which is greater in value than a specified threshold value, and whose second state corresponds to a voltage drop that is less in value than said specified threshold value;
 f) deriving a second instant of time from an edge between these two logic states, which corresponds to an attainment of the current zero point, and then storing said second instant of time for use in providing a time-delayed firing signal;
 g) deriving a first instant of time from an edge of the firing signal and then storing the first instant for use in providing a subsequent, time-delayed safety signal; and
 h) applying a firing signal determined by the instant of time last stored.

23. A device for open-loop control of single phase or multiphase A.C. power controllers comprising:
 a) a semiconductor valve in series connection between a load and a phase of the A.C. system;
 b) means being coupled to said semiconductor valve for producing firing signals that are used for firing the semiconductor valve;
 c) a reference detector for producing reference signals when the current flowing through said semiconductor valve reaches a predetermined characteristic value, each of said reference signals defining a time instant at which the current reaches its characteristic value; and
 d) means for testing whether a reference signal has been produced within a specified time interval following a preceding firing signal, wherein
 e) said means for producing firing signals derives a time-delayed firing signal from the reference signal if a reference signal has been produced within said specified time interval and derives a safety firing signal from a preceding time-delayed firing signal if a reference signal has not been produced within said specified time interval, whereby said safety firing signal follows in said specified time interval after said preceding time-delayed firing signal.

* * * * *